US012566863B2

(12) United States Patent
Seck et al.

(10) Patent No.: US 12,566,863 B2
(45) Date of Patent: Mar. 3, 2026

(54) VISUALIZATION OF SECURITY VULNERABILITIES

(71) Applicant: Capital One Services, LLC, McLean, VA (US)

(72) Inventors: Mohamed Seck, Aubrey, TX (US); Emmanuel Adu, Reno, NV (US); Thad Joshua Tayo, Arlington, VA (US); Krystan R. Franzen, Mechanicsville, VA (US)

(73) Assignee: Capital One Services, LLC, McLean, VA (US)

( * ) Notice: Subject to any disclaimer, the term of this patent is extended or adjusted under 35 U.S.C. 154(b) by 197 days.

(21) Appl. No.: 18/305,701

(22) Filed: Apr. 24, 2023

(65) Prior Publication Data

US 2024/0354420 A1     Oct. 24, 2024

(51) Int. Cl.
| | |
|---|---|
| *G06F 21/57* | (2013.01) |
| *G06F 21/55* | (2013.01) |
| *H04L 9/40* | (2022.01) |
| *H04L 41/22* | (2022.01) |

(52) U.S. Cl.
CPC .......... *G06F 21/577* (2013.01); *G06F 21/552* (2013.01); *H04L 63/20* (2013.01); *G06F 2221/033* (2013.01); *H04L 41/22* (2013.01); *H04L 63/1433* (2013.01)

(58) Field of Classification Search
None
See application file for complete search history.

(56) References Cited

U.S. PATENT DOCUMENTS

| | | | |
|---|---|---|---|
| 2014/0047546 A1* | 2/2014 | Sidagni | G06F 21/577 |
| | | | 726/25 |
| 2017/0098086 A1* | 4/2017 | Hoernecke | G06F 11/3688 |
| 2021/0168165 A1* | 6/2021 | Alsaeed | G06N 20/00 |
| 2021/0234889 A1* | 7/2021 | Burle | H04L 63/1433 |
| 2022/0103587 A1* | 3/2022 | Velugu | H04L 67/02 |
| 2022/0222350 A1 | 7/2022 | Franzen et al. | |
| 2022/0279011 A1 | 9/2022 | Velugu et al. | |
| 2022/0391495 A1* | 12/2022 | Boshev | G06F 21/577 |
| 2023/0004652 A1* | 1/2023 | Gupta | G06F 21/562 |
| 2023/0283521 A1* | 9/2023 | Berger | H04L 63/20 |
| | | | 709/223 |
| 2024/0394379 A1* | 11/2024 | Gorelik | G06F 21/577 |

OTHER PUBLICATIONS

International Search Report and Written Opinion for Application No. PCT/US2024/025801, mailed on Jul. 18, 2024, 12 pages.

* cited by examiner

*Primary Examiner* — Philip J Chea
*Assistant Examiner* — Bin Qing Zheng
(74) *Attorney, Agent, or Firm* — Harrity & Harrity, LLP

(57) ABSTRACT

In some implementations, a remediation engine may receive an indication of a security vulnerability. The remediation engine may determine a plurality of cloud-based applications affected by the security vulnerability. The remediation engine may generate a relational structure that organizes the plurality of cloud-based applications. The remediation engine may transmit, to a user device, instructions for a visual representation of the relational structure. The remediation engine may receive, from the user device, an indication of an interaction with the visual representation. The remediation engine may trigger a remediation action in response to the indication of the interaction.

20 Claims, 9 Drawing Sheets

100
120 Determine false positive(s)

125 Instructions for visual representation

Remediation Engine

130 Show visual representation

Enterprise (37)
Environment 1 (14)
Environment 2 (4)
Environment 3 (17)

App 1 (3)
App 2 (4)
App 3 (6)
App 4 (1)
App 5 (0)
App 6 (0)
App 7 (4)
App 8 (10)
App 9 (5)
App 10 (2)
App 11 (0)

User device

100

140
Interaction
indication

145
Ticket(s)

User device

135
Ticket(s)

Remediation
Engine

Ticket system

User device

170
Interaction
indication

175
Window with
details

**Remediation
Engine**

165
Remediation
action indication

Ticket system

100

500

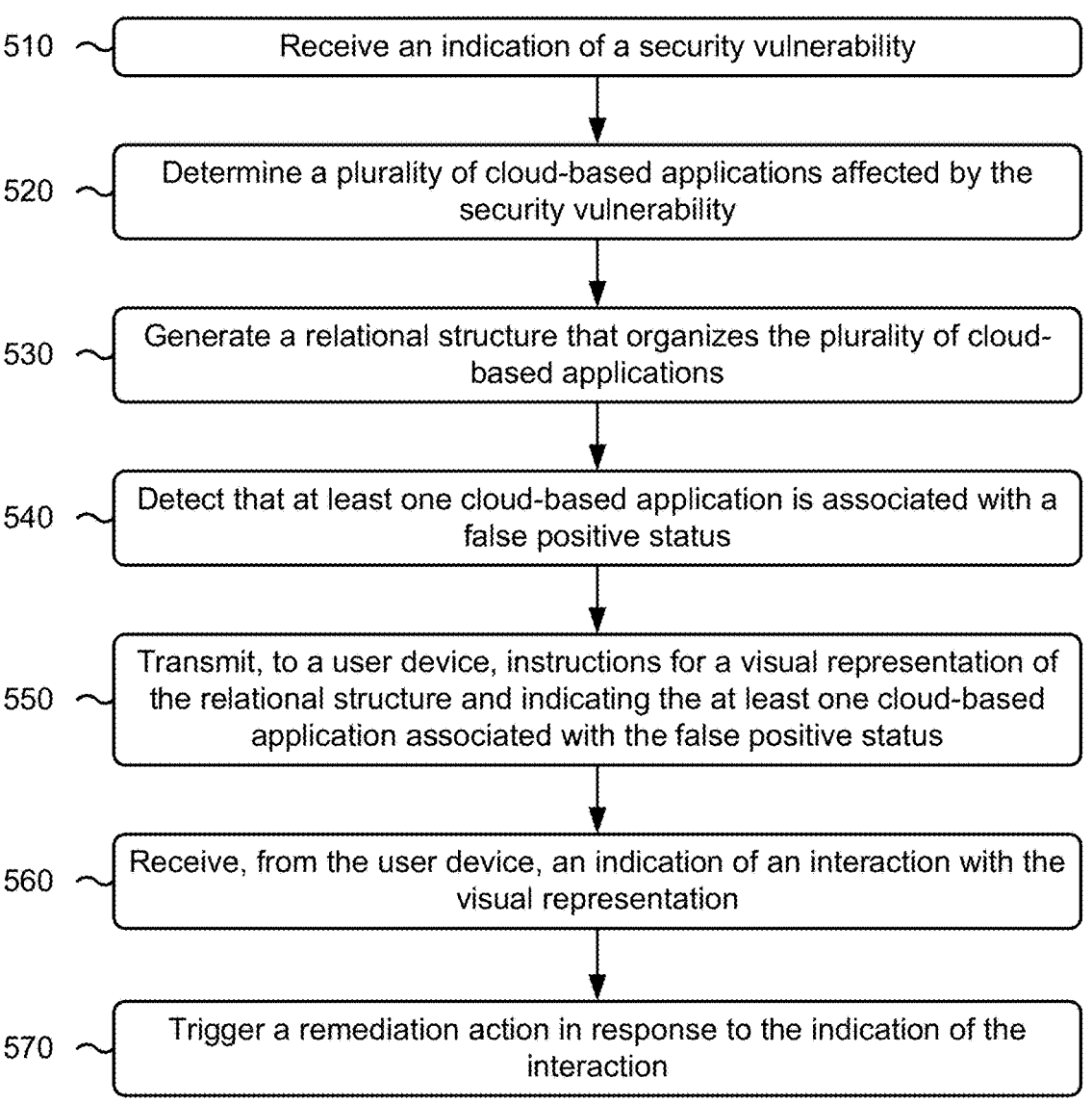

510 ~ Receive an indication of a security vulnerability

520 ~ Determine a plurality of cloud-based applications affected by the security vulnerability 530 ~ Generate a relational structure that organizes the plurality of cloud-based applications 540 ~ Detect that at least one cloud-based application is associated with a false positive status 550 ~ Transmit, to a user device, instructions for a visual representation of the relational structure and indicating the at least one cloud-based application associated with the false positive status 560 ~ Receive, from the user device, an indication of an interaction with the visual representation 570 ~ Trigger a remediation action in response to the indication of the interaction

FIG. 5

VISUALIZATION OF SECURITY VULNERABILITIES

BACKGROUND

Security vulnerabilities may arise when cloud-based applications are due for security patches or other software updates. Similarly, vulnerabilities may arise when cloud-based images (that may, for example, be used to create cloud instances) are not refreshed (e.g., by having instances based on those images rebooted, rehydrated, or otherwise reestablished).

SUMMARY

Some implementations described herein relate to a system for visualizing security vulnerabilities across cloud applications. The system may include one or more memories and one or more processors communicatively coupled to the one or more memories. The one or more processors may be configured to receive an indication of a security vulnerability. The one or more processors may be configured to determine a plurality of cloud-based applications affected by the security vulnerability. The one or more processors may be configured to generate a relational structure that organizes the plurality of cloud-based applications. The one or more processors may be configured to detect that at least one cloud-based application, of the plurality of cloud-based applications, is associated with a false positive status. The one or more processors may be configured to transmit, to a user device, instructions for a visual representation of the relational structure and indicating the at least one cloud-based application associated with the false positive status. The one or more processors may be configured to receive, from the user device, an indication of an interaction with the visual representation. The one or more processors may be configured to trigger a remediation action in response to the indication of the interaction.

Some implementations described herein relate to a method of visualizing security vulnerabilities across cloud applications. The method may include receiving an indication of a security vulnerability. The method may include determining a plurality of cloud-based applications affected by the security vulnerability. The method may include generating a relational structure that organizes the plurality of cloud-based applications. The method may include transmitting, to a user device, instructions for a visual representation of the relational structure. The method may include receiving, from the user device, an indication of an interaction with the visual representation. The method may include triggering a remediation action in response to the indication of the interaction.

Some implementations described herein relate to a non-transitory computer-readable medium that stores a set of instructions for visualizing security vulnerabilities across cloud applications. The set of instructions, when executed by one or more processors of a device, may cause the device to receive an indication of a security vulnerability. The set of instructions, when executed by one or more processors of the device, may cause the device to determine a plurality of cloud-based applications affected by the security vulnerability. The set of instructions, when executed by one or more processors of the device, may cause the device to generate a relational structure that organizes the plurality of cloud-based applications. The set of instructions, when executed by one or more processors of the device, may cause the device to transmit, to a user device, instructions for a visual representation of the relational structure. The set of instructions, when executed by one or more processors of the device, may cause the device to receive, from the user device, an indication of an interaction with the visual representation. The set of instructions, when executed by one or more processors of the device, may cause the device to trigger an action in response to the indication of the interaction.

BRIEF DESCRIPTION OF THE DRAWINGS

FIG. 5 is a flowchart of an example process relating to visualization of security vulnerabilities, in accordance with some embodiments of the present disclosure.

DETAILED DESCRIPTION

The following detailed description of example implementations refers to the accompanying drawings. The same reference numbers in different drawings may identify the same or similar elements.

In some cloud environments, application services (ASVs) or other cloud-based applications may exhibit security vulnerabilities. For example, vulnerabilities may arise when the cloud-based applications are due for security patches or other software updates. Similarly, cloud-based applications may experience vulnerabilities when corresponding cloud-based images (used, for example, to create cloud instances) are not periodically refreshed (e.g., by having instances based on those images rebooted, rehydrated, or otherwise reestablished). When cloud-based images are not refreshed, they may be referred to as "stale" and cloud-based applications relying on the images may be more susceptible to cyberattacks.

Technical administrators may collect information regarding vulnerabilities associated with ASVs from corresponding cloud environments. However, these administrators may be required to communicate the vulnerabilities to users, who can then authorize security patches (or other software updates) and can refresh the cloud-based images. Some techniques for alerting users include non-intuitive interfaces that are text-based. Additionally, some ASVs that are indicated as affected by a security vulnerability may be false positives. As a result, the users may waste power, processing resources, and network resources attempting to resolve the false positives.

Providing a dashboard that uses a relational visualization to quickly and visually inform users improves user experience, and the users are more likely to perform remediation. Some implementations described herein enable instructions for a visual representation of a relational structure that organizes cloud-based applications. As a result, the users may remediate security vulnerabilities that impact multiple cloud-based applications with fewer steps, which conserves power, processing resources, and network resources. Additionally, some implementations described herein enable detection (and visual representation) of false positives. As a result, power, processing resources, and network resources are conserved that otherwise would have been wasted trying to resolve the false positives.

FIGS. 1A-1E are diagrams of an example 100 associated with visualization of security vulnerabilities. As shown in FIGS. 1A-1E, example 100 includes a remediation engine, one or more cloud databases, one or more cloud environments, a user device, a ticket system, and a remediation library. These devices are described in more detail in connection with FIGS. 3 and 4.

Figure 1A:
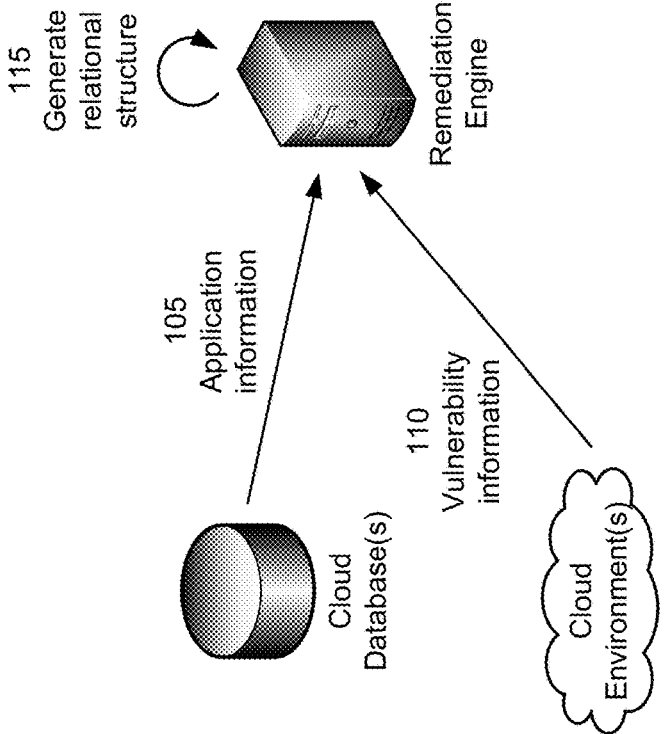
FIGS. 1A-1E are diagrams of an example implementation relating to visualization of security vulnerabilities, in accordance with some embodiments of the present disclosure.

As shown in FIG. 1A and by reference number 105, the cloud database(s) may transmit, and the remediation engine may receive, information associated with cloud-based applications (e.g., a plurality of cloud-based applications). The information may include an indication of a security vulnerability (e.g., at least one security vulnerability).

In some implementations, the remediation engine may transmit, and the cloud database(s) may receive, a request for the information. For example, the request may include a hypertext transfer protocol (HTTP) request and/or an application programming interface (API) call, among other examples. The request may include (e.g., in a header and/or as an argument) indications of the cloud-based applications (e.g., one or more indications of the plurality of cloud-based applications) associated with the security vulnerability and/ or an indication of the security vulnerability. Accordingly, the cloud database(s) may transmit the information in response to the request. The remediation engine may transmit the request according to a schedule (e.g., once per hour or once per day, among other examples) and/or in response to a command to transmit the request. For example, the user device may transmit, and the remediation engine may receive, the command, such that the remediation engine transmits the request in response to the command.

Additionally, or alternatively, the remediation engine may subscribe to information updates from the cloud database(s). Accordingly, the cloud database(s) may transmit the information according to a schedule (e.g., once per hour or once per day, among other examples) and/or as available (e.g., shortly after the security vulnerability is detected).

The cloud database(s) may store information regarding security vulnerabilities. In some implementations, the cloud database(s) may include an on-site database and/or a remote database storing the information. In some implementations, the cloud database(s) may be relational, such that security vulnerability indications are stored in association (e.g., via rows and/or columns) with identifiers of the cloud-based applications. As another example, the cloud database(s) may be graphical, such that nodes representing the cloud-based applications are connected (e.g., via edges) to nodes representing the security vulnerability indications. In some implementations, the cloud database(s) may receive the information automatically (e.g., as output from one or more ASVs) and/or manually (e.g., entered by one or more administrators associated with the cloud-based applications). In some implementations, the security vulnerability indications may indicate a required patch and/or other software update, a missing firewall or other network security software, missing anti-virus and/or other anti-malware software, subpar encryption keys and/or other encryption protocols, out-of-date hardware drivers, and/or other vulnerabilities associated with the cloud-based applications.

Additionally, or alternatively, as shown by reference number 110, the cloud environment(s) may transmit, and the remediation engine may receive, information associated with the cloud-based applications. The information may include an indication of the security vulnerability. The cloud environment(s) may include one or more Amazon Web Services® (AWS®) servers, one or more Amazon Virtual Private Cloud® (VPC) servers, one or more Microsoft Azure® servers, one or more Amazon® Machine Images (AMIs), one or more other cloud-based images supporting instances of cloud-based applications, and/or one or more servers associated with one or more other cloud environments.

In some implementations, the remediation engine may transmit, and the cloud environment(s) may receive, a request for the information. For example, the request may include an HTTP request and/or an API call, among other examples. The request may include (e.g., in a header and/or as an argument) indications of the cloud-based applications (e.g., one or more indications of the plurality of cloud-based applications) associated with the security vulnerability. Accordingly, the cloud environment(s) may transmit the information in response to the request. The remediation engine may transmit the request according to a schedule (e.g., once per hour or once per day, among other examples) and/or in response to a command to transmit the request. For example, the user device may transmit, and the remediation engine may receive, the command, such that the remediation engine transmits the request in response to the command.

Additionally, or alternatively, the remediation engine may subscribe to information updates from the cloud environment(s). Accordingly, the cloud environment(s) may transmit the information according to a schedule (e.g., once per hour or once per day, among other examples) and/or as available (e.g., shortly after a change to one of the cloud-based applications is detected).

In some implementations, the remediation engine may determine the cloud-based applications affected by the security vulnerability. In one example, the remediation engine may extract indicators (e.g., a plurality of indicators), corresponding to the cloud-based applications, from the indication of the security vulnerability. In another example, the remediation engine may transmit a request, to the cloud environment(s), including an indication of a cloud-based application from the indication of the security vulnerability, such that the cloud environment(s) transmits, to the remediation engine, indications of the cloud-based applications, affected by the security vulnerability, based on dependencies between the cloud-based application from the indication of the security vulnerability and others of the cloud-based applications.

Although the example 100 is described with the remediation engine receiving the indication of the security vulnerability from the cloud database(s) and/or the cloud environment(s), other examples may additionally or alternatively include the remediation engine receiving information, associated with the security vulnerability, from the ticket system. For example, the ticket system may transmit, and the remediation engine may receive, data structures (e.g., a plurality of data structures) representing tickets (e.g., a plurality of tickets) based on problems with the cloud-based applications. For example, the data structures may include C language structs, object-oriented classes, and/or other data structures that indicate or include information about the problem (e.g., a string including a description of the problem and/or an identifier associated with the problem) associated with identifiers of the cloud-based applications (e.g., process identifiers, thread identifiers, alphanumeric names, and/or other identifiers). The ticket system may include a server that accepts reports from users (e.g., one or more users) of the cloud-based environment(s) regarding problems with the cloud-based applications. Therefore, the tickets may be associated with the security vulnerability that is causing the problems.

As shown by reference number 115, the remediation engine may generate a relational structure that organizes the cloud-based applications. The relational structure may include a tree structure. For example, the cloud-based applications may represent leaves that are connected to a common trunk (or root), optionally via one or more branches. Other relational structures may include a graph or another structured data type.

In some implementations, the remediation engine may receive (e.g., from a database, such as the cloud database(s)) information associated with the cloud-based applications and organize the cloud-based applications based on the information. For example, the information may include dependency indicators (e.g., references and/or other data structures) that indicate associations (e.g., data input and output, among other examples) between the cloud-based applications. Additionally, or alternatively, the information may include categories (optionally with sub-categories) associated with the cloud-based applications. For example, as described in connection with FIG. 2, the remediation engine may group the cloud-based applications according to host environment (e.g., based on a plurality of host environments) and according to enterprise (e.g., based on one or more enterprises). Other categories may include host operating system (OS), team, responsible user (also referred to as an "owner"), and/or physical location (e.g., when the cloud-based applications are implemented across multiple physical servers or server farms), among other examples.

Figure 1B:
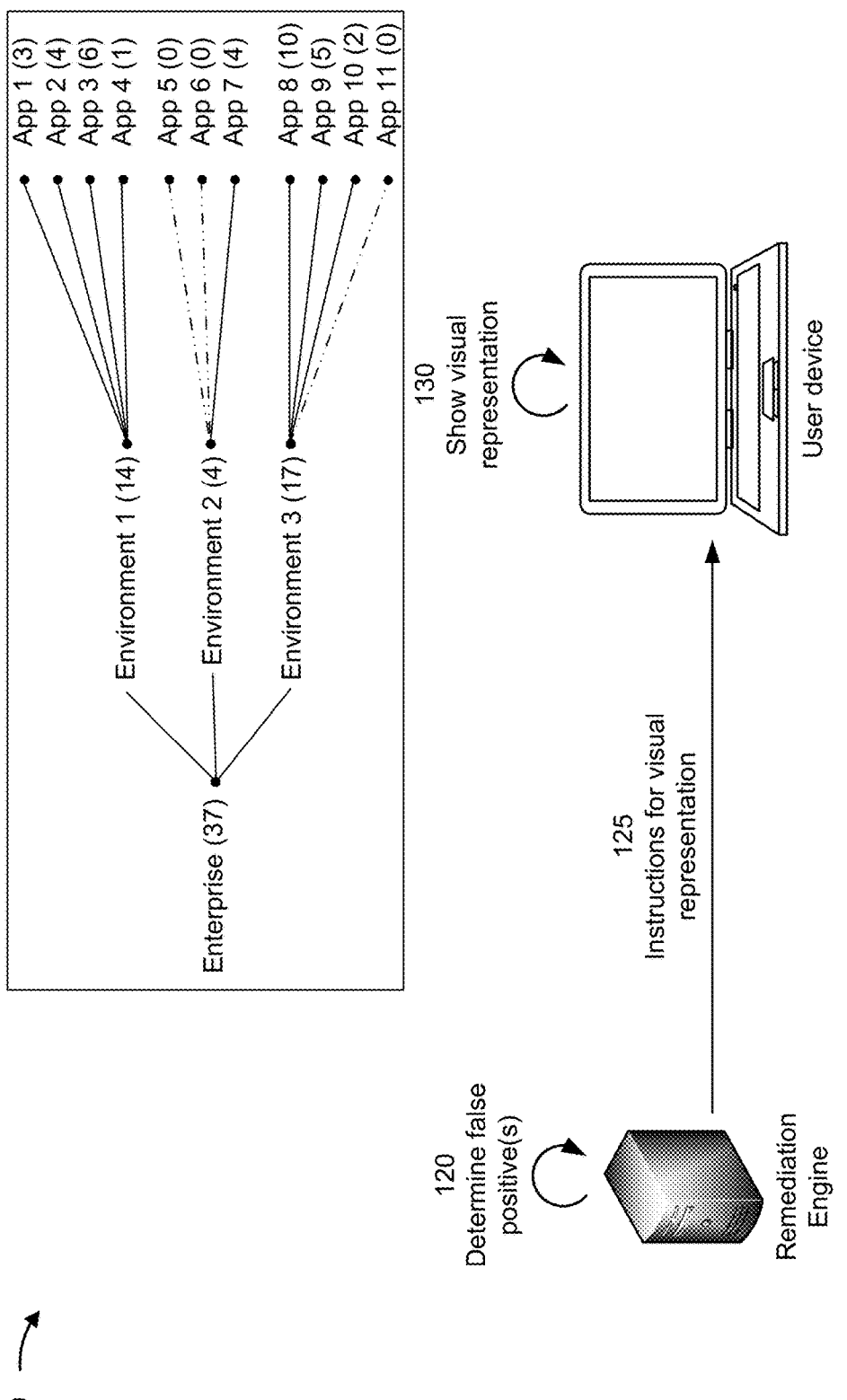

In some implementations, as shown in FIG. 1B and by reference number 120, the remediation engine may determine false positives (e.g., one or more false positives) associated with the security vulnerability. For example, the remediation engine may detect that a cloud-based application (e.g., at least one cloud-based application), out of the cloud-based applications, is associated with a false positive status.

In some implementations, the remediation engine may receive, from a data source (e.g., one or more data sources), a bulletin (e.g., one or more bulletins) or another type of information associated with the security vulnerability. For example, the remediation engine may scrape a server (e.g., one or more servers) that hosts a website (e.g., one or more websites) to obtain the bulletin. The remediation engine may save a web page (e.g., one or more hypertext markup language (HTML) files and/or supporting files, such as image files, cascading style sheet (CSS) files, and/or other website-related files), extract text and/or supporting images from the web page, or otherwise store the bulletin. Additionally, or alternatively, the remediation engine may receive the bulletin from the server (e.g., according to a schedule). In some implementations, the remediation engine may receive a universal resource locator (URL) and/or another indicator for each news bulletin. Based on the bulletin, the remediation engine may determine that the cloud-based application, out of the cloud-based applications, is unaffected by the security vulnerability. For example, the remediation engine may extract a list of affected applications from the bulletin and determine that the cloud-based application, out of the cloud-based applications, is absent from the list.

Additionally, or alternatively, the remediation engine may compare the information from the cloud database(s) with the information from the cloud environment(s) to determine that the cloud-based application, out of the cloud-based applications, is unaffected by the security vulnerability. For example, the cloud database(s) may indicate that the security vulnerability impacts all of the cloud-based applications, but the cloud environment associated with the cloud-based application may indicate that the cloud-based application is functioning normally. Therefore, the remediation engine may determine that the cloud-based application, out of the cloud-based applications, is unaffected by the security vulnerability. Additionally, or alternatively, the remediation engine may compare the information from the cloud database(s) with the data structures from the ticket system to determine that the cloud-based application, out of the cloud-based applications, is unaffected by the security vulnerability. For example, the cloud database(s) may indicate that the security vulnerability impacts all of the cloud-based applications, but the ticket system may indicate a lack of tickets associated with the cloud-based application and/or may indicate that a ticket associated with the cloud-based application has been resolved. Therefore, the remediation engine may determine that the cloud-based application, out of the cloud-based applications, is unaffected by the security vulnerability.

Additionally, or alternatively, the remediation engine may apply a machine learning model to determine that the cloud-based application, out of the cloud-based applications, is unaffected by the security vulnerability. In some implementations, the remediation engine may input the information from the cloud database(s), the information from the cloud environment(s), and/or data structures from the ticket system to the machine learning model and receive, from the machine learning model, an indication that the cloud-based application, out of the cloud-based applications, is unaffected by the security vulnerability. The indication may include a Boolean value or another type of binary indicator of whether the cloud-based application is impacted by the security vulnerability. Additionally, or alternatively, the indication may include a probability (or another type of numeric indicator) of whether the cloud-based application is impacted by the security vulnerability. Accordingly, the remediation engine may determine that the cloud-based application, out of the cloud-based applications, is unaffected by the security vulnerability based on the probability failing to satisfy an impact threshold.

In some implementations, the machine learning model may include a regression algorithm (e.g., linear regression or logistic regression), which may include a regularized regression algorithm (e.g., Lasso regression, Ridge regression, or Elastic-Net regression). Additionally, or alternatively, the machine learning model may include a decision tree algorithm, which may include a tree ensemble algorithm (e.g., generated using bagging and/or boosting), a random forest algorithm, or a boosted trees algorithm. A model parameter may include an attribute of a machine learning model that is learned from data input into the model (e.g., the historical cloud computing task information). For example, for a regression algorithm, a model parameter may include a regression coefficient (e.g., a weight). For a decision tree algorithm, a model parameter may include a decision tree split location, as an example.

Additionally, the remediation engine may use one or more hyperparameter sets to tune the model. A hyperparameter may include a structural parameter that controls execution of a machine learning algorithm by the cloud management device, such as a constraint applied to the machine learning algorithm. Unlike a model parameter, a hyperparameter is not learned from data input into the model. An example hyperparameter for a regularized regression algorithm includes a strength (e.g., a weight) of a penalty applied to a regression coefficient to mitigate overfitting of the model. The penalty may be applied based on a size of a coefficient value (e.g., for Lasso regression, such as to penalize large coefficient values), may be applied based on a squared size of a coefficient value (e.g., for Ridge regression, such as to penalize large squared coefficient values), may be applied based on a ratio of the size and the squared size (e.g., for Elastic-Net regression), and/or may be applied by setting one or more feature values to zero (e.g., for automatic feature selection). Example hyperparameters for a decision tree algorithm include a tree ensemble technique to be applied (e.g., bagging, boosting, a random forest algorithm, and/or a boosted trees algorithm), a number of features to evaluate, a number of observations to use, a maximum depth of each decision tree (e.g., a number of branches permitted for the decision tree), or a number of decision trees to include in a random forest algorithm.

Other examples may use different types of models, such as a Bayesian estimation algorithm, a k-nearest neighbor algorithm, an a priori algorithm, a k-means algorithm, a support vector machine algorithm, a neural network algorithm (e.g., a convolutional neural network algorithm), and/or a deep learning algorithm.

As shown by reference number 125, the remediation engine may transmit, and the user device may receive, instructions for a visual representation of the relational structure. Accordingly, as shown by reference number 130, the user device may show or otherwise output a user interface (UI), based on the instructions, for a user of the user device (e.g., via a display, a speaker, or another type of output component). The visual representation may be as described in connection with FIG. 2.

In some implementations, the visual representation may include a first color that indicates the cloud-based applications affected by the security vulnerability and a second color that indicates additional cloud-based applications (e.g., one or more additional cloud-based applications) unaffected by the security vulnerability. Additionally, or alternatively, the visual representation may include a first color that indicates a branch of the relational structure that includes a greater quantity of cloud-based applications and a second color that indicates a branch of the relational structure that includes a smaller quantity of cloud-based applications.

Additionally, or alternatively, the visual representation may include a first color that indicates a first portion of the cloud-based applications associated with a first priority and a second color that indicates a second portion of the cloud-based applications associated with a second priority. In some implementations, the remediation engine may identify the priorities using a database. For example, the remediation engine may query the database (e.g., using structured query language (SQL) for a relational database or a different type of query for a NoSQL database) to determine priority levels associated with cloud-based applications. Accordingly, the remediation engine may determine the priority by mapping priority levels in the database to identifiers of the cloud-based applications (e.g., associated with the security vulnerability). The database may be local to the remediation engine (e.g., stored in a memory managed by the remediation engine). Alternatively, the database may be at least partially external (e.g., physically, logically, and/or virtually) from the remediation engine. Therefore, the remediation engine may transmit the query to the database (e.g., included in an HTTP request and/or using an API call) and receive a response to the query (e.g., included in an HTTP response and/or as a return from the API call).

Although the example 100 is described with respect to using two colors in the visual representation, other examples may use more than two colors in the visual representation (e.g., to represent quantities of cloud-based applications and/or priority levels, as described above). Moreover, although the example 100 is described with respect to using colors in the visual representation, other examples may use different lines (e.g., different dotted or dashed lines) in addition to, or in lieu of, colors.

The visual representation may further indicate the cloud-based application associated with the false positive status. For example, as shown in FIG. 1B, the visual representation includes a dotted line that indicates cloud-based applications associated with the false positive status. Although the example 100 is described with respect to using different lines (e.g., different dotted or dashed lines) in the visual representation, other examples may use colors to represent false positive status.

In some implementations, the remediation engine may further determine, for the cloud-based applications, corresponding instance quantities (e.g., a corresponding plurality instance quantities) affected by the security vulnerability. Accordingly, the visual representation may further indicate the instance quantities. For example, as shown in FIG. 1B, the cloud-based application "App 1" has three instances impacted by the security vulnerability while the cloud-based application "App 2" has four instances impacted by the security vulnerability.

Although the example 100 is described in connection with the visual representation, other examples may include the remediation engine outputting the relational structure to the user device as text or another non-visual data type.

Figure 1C:
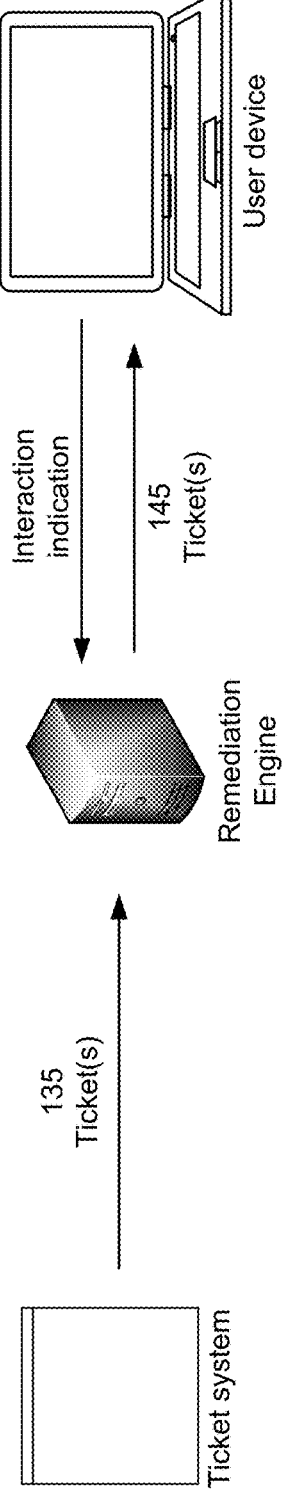

For example, as shown in FIG. 1C and by reference number 135, the ticket system may transmit, and the remediation engine may receive, a data structure (e.g., at least one data structure) representing a ticket (e.g., at least one ticket) associated with the security vulnerability. In some implementations, the remediation engine may transmit, and the ticket system may receive, a request for the data structure. For example, the request may include an HTTP request and/or an API call, among other examples. The request may include (e.g., in a header and/or as an argument) indications of the cloud-based applications (e.g., one or more indications of the plurality of cloud-based applications) associated with the security vulnerability and/or an indication of the security vulnerability. Accordingly, the ticket system may transmit the information in response to the request. The remediation engine may transmit the request according to a schedule (e.g., once per hour or once per day, among other examples) and/or in response to a command to transmit the request. For example, the user device may transmit, and the remediation engine may receive, the command, such that the remediation engine transmits the request in response to the command.

Additionally, or alternatively, the remediation engine may subscribe to ticket updates from the ticket system. Accordingly, the ticket system may transmit the data structure according to a schedule (e.g., once per hour or once per day, among other examples) and/or as available (e.g., shortly after new tickets are created and/or existing tickets are modified).

The visual representation may also be interactive. For example, as shown by reference number 140, the user device may transmit, and the remediation engine may receive, an indication of an interaction with the visual representation.

For example, the user of the user device may interact with a UI including the visual representation (e.g., via a keyboard, a mouse, a touchscreen, or another type of input component) and trigger the user device to transmit the indication. The user may perform a left click, a tap, push an enter key, speak an audio command, or perform another type of action to interact with the UI.

The remediation engine may trigger an action in response to the indication of the interaction. In one example, as shown by reference number 145, the remediation engine may transmit, and the user device may receive, an indication of the ticket in response to the interaction. In some implementations, the indication may include a link (e.g., a hyperlink to an Internet website) such that the user of the user device may interact with the link (e.g., via a keyboard, a mouse, a touchscreen, or another type of input component) to trigger the user device to navigate using the link (e.g., via a web browser or another type of application). The link may be associated with a webpage or another front-end hosted (or at least managed) by the ticket system. Accordingly, the user may view (and optionally edit) the ticket using the link. Alternatively, the indication may include instructions for an overlay window (e.g., over the visual representation) that includes details about the ticket. Therefore, from the user's perspective, the user device shows the overlay window with details of the ticket in response to the interaction. In some implementations, the remediation engine may determine a cloud-based application associated with the interaction such that the window provides details about the ticket associated with the cloud-based application that is associated with the interaction. For example, a location (e.g., in pixels) associated with the interaction may be associated with one of the cloud-based applications. As a result, the user may interact with a portion of the visual representation that depicts one of the cloud-based applications in order to receive details about the ticket for that cloud-based application.

Figure 1D:
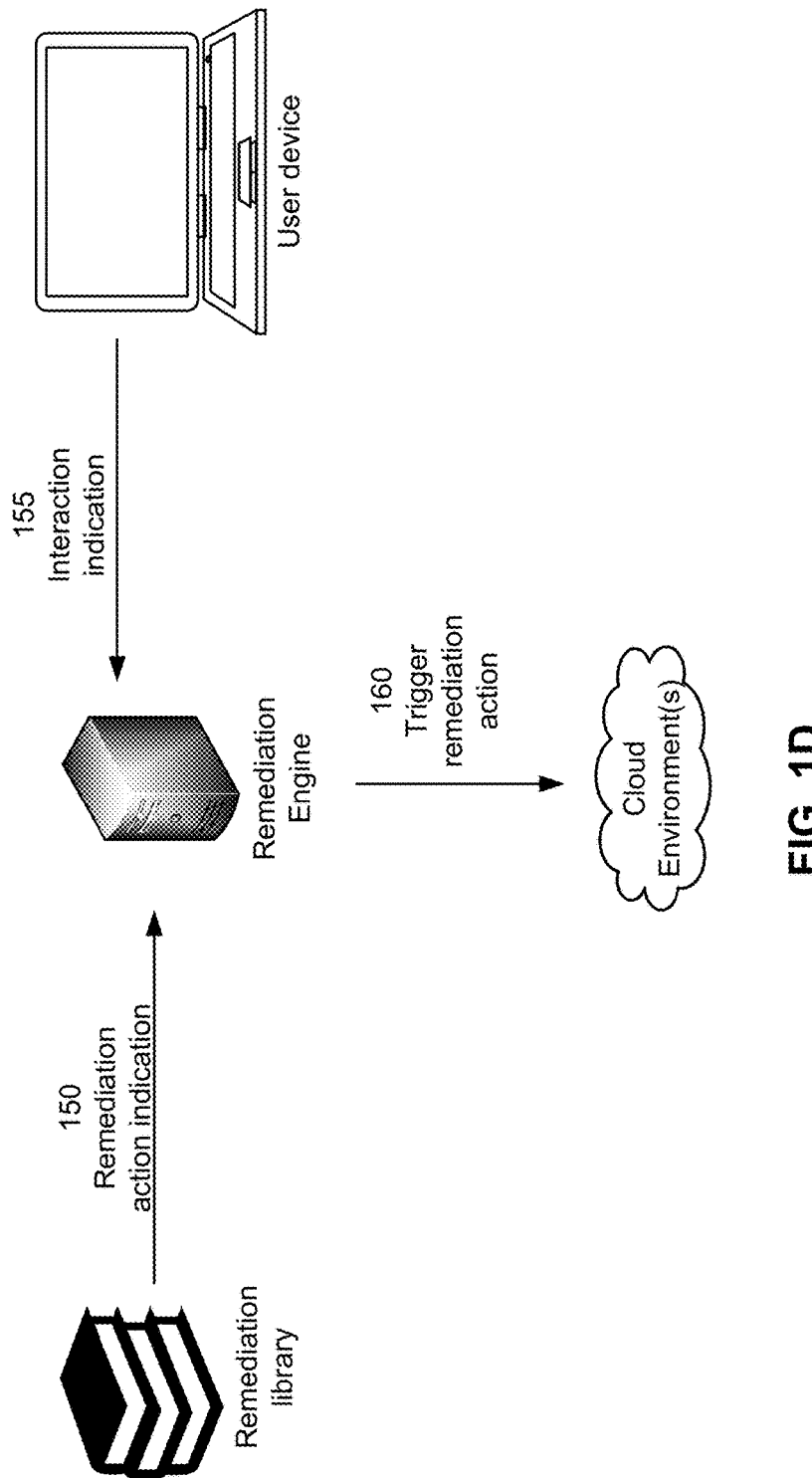

Additionally, or alternatively, the action may include a remediation action. For example, as shown in FIG. 1D and by reference number 150, the remediation engine may receive, from the remediation library, an indication of the remediation action. The indication may include an automated remediation script or an identifier (e.g., a filename or a link, among other examples) to the automated remediation script. The automated remediation script may include Bourne Again Shell (BASH) instructions, Python instructions, and/or other scriptable instructions that will trigger a plurality of commands. In one example, the remediation engine may transmit an HTTP POST call to a webhook based on the indication of the remediation action. Accordingly, the webhook may call an API to trigger the automated remediation script.

As shown by reference number 155, the user device may transmit, and the remediation engine may receive, an indication of an interaction with the visual representation. Therefore, the remediation engine may trigger the automated remediation script after based on the indication of the interaction.

As shown by reference number 160, the automated remediation script may instruct the cloud environment(s) to perform an action for one of the cloud-based applications associated with the security vulnerability. For example, the automated remediation script may trigger a patch and/or other software update to the cloud-based application. In another example, the automated remediation script may trigger a refresh (also referred to as a "reboot" or a "rehydration") of a cloud-based image supporting the cloud-based application.

Although the example 100 is described as using an automated remediation script, other examples may use machine learning. In some implementations, the remediation engine may input the information from the cloud database(s), the information from the cloud environment(s), and/or data structures from the ticket system to a machine learning model and receive an indication of the remediation action from the machine learning model. In some implementations, the machine learning model may include a regression algorithm (e.g., linear regression or logistic regression), which may include a regularized regression algorithm (e.g., Lasso regression, Ridge regression, or Elastic-Net regression). Additionally, or alternatively, the machine learning model may include a decision tree algorithm, which may include a tree ensemble algorithm (e.g., generated using bagging and/or boosting), a random forest algorithm, or a boosted trees algorithm. Additionally, the remediation engine may use one or more hyperparameter sets to tune the machine learning model. Other examples may use different types of models, such as a Bayesian estimation algorithm, a k-nearest neighbor algorithm, an a priori algorithm, a k-means algorithm, a support vector machine algorithm, a neural network algorithm (e.g., a convolutional neural network algorithm), and/or a deep learning algorithm.

Figure 1E:
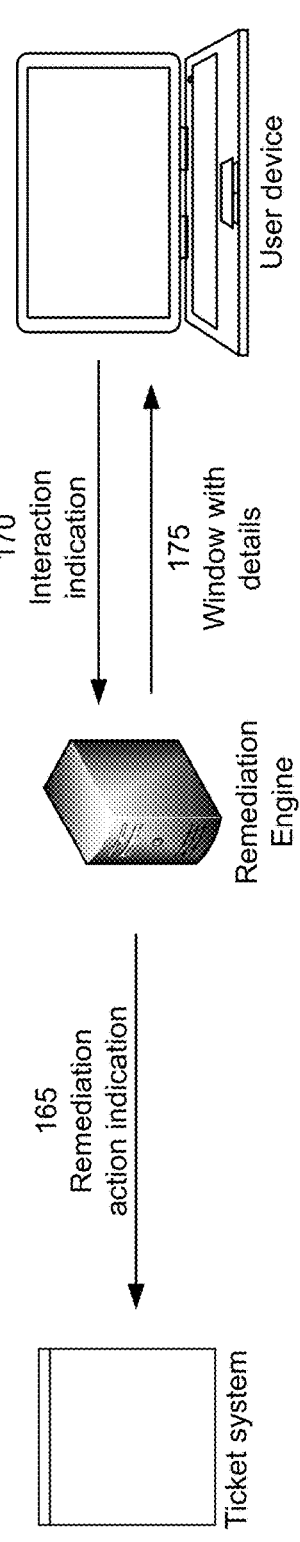

Further, as shown in FIG. 1E and by reference number 165, the remediation engine may transmit, and the ticket system may receive, an indication of the remediation action. For example, the remediation engine may include a datetime associated with the remediation action, a list of commands transmitted to the cloud environment(s), and/or output received from the cloud environment(s) in response to the commands. Accordingly, the ticket system may update the ticket with information included in the indication of the remediation action. Additionally, or alternatively, the ticket system may change a status of the ticket to resolved. For example, the remediation engine may verify that the remediation action resolved the security vulnerability and transmit the indication accordingly. In another example, the remediation engine may trigger the ticket system to verify that the remediation action resolved the security vulnerability by transmitting the indication of the remediation action.

In some implementations, the remediation engine may identify the ticket associated with the security vulnerability. For example, the remediation engine may transmit, to the ticket system, a request associated with the security vulnerability and may receive, from the ticket system, a data structure (e.g., at least one data structure) representing the ticket. Accordingly, the remediation engine may transmit the indication of the remediation action including an identifier (e.g., at least one identifier) associated with the ticket. As a result, the ticket system may map the indication of the remediation action to the ticket for updating.

Additionally, or alternatively, the action may include generating instructions for a details window. For example, as shown by reference number 170, the user device may transmit, and the remediation engine may receive, an indication of an interaction with the visual representation. Therefore, as shown by reference umber 175, the remediation engine may transmit, and the user device may receive, instructions for a window, over the visual representation, that provides details (e.g., one or more details) about one of the cloud-based applications. For example, the window may include information from the cloud database(s), information from the cloud environment(s), and/or data structures from the ticket system. In some implementations, the remediation engine may determine a cloud-based application associated with the interaction such that the window provides details about the cloud-based application associated with the interaction. For example, a location (e.g., in pixels) associated with the interaction may be associated with one of the cloud-based applications. As a result, the user may interact with a portion of the visual representation that depicts one of the cloud-based applications in order to receive details about that cloud-based application.

By using techniques as described in connection with FIGS. 1A-1E, the remediation engine provides the visual representation of the relational structure. As a result, the user of the user device may remediate the security vulnerability that impacts the cloud-based applications with fewer steps, which conserves power, processing resources, and network resources. Additionally, the remediation engine detects false positives and indicates false positives in the visual representation. As a result, power, processing resources, and network resources are conserved that otherwise would have been wasted trying to resolve the false positives.

As indicated above, FIGS. 1A-1E are provided as an example. Other examples may differ from what is described with regard to FIGS. 1A-1E.

Figure 2:
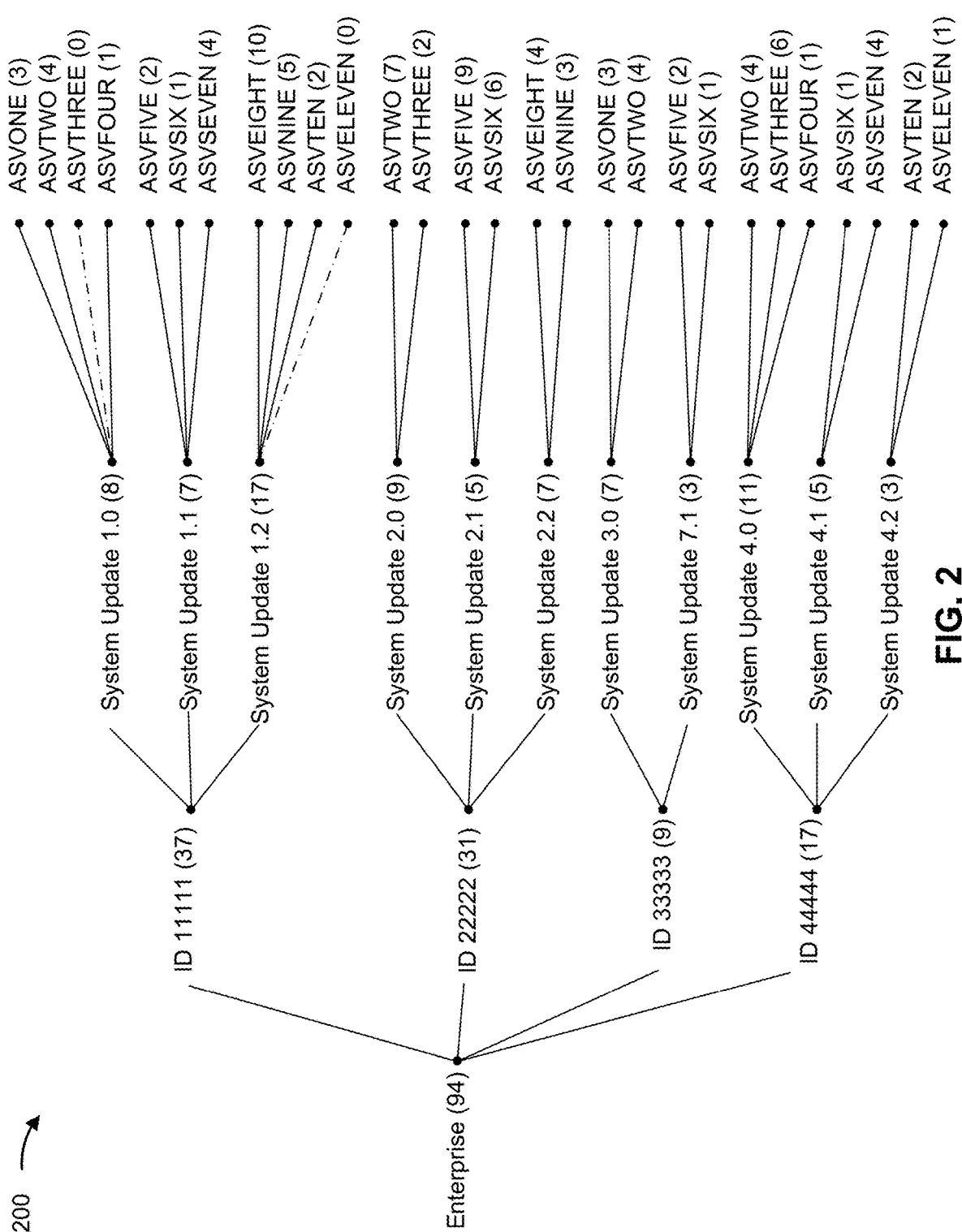
FIG. 2 is a diagram of an example user interface generated by systems and/or methods described herein, in accordance with some embodiments of the present disclosure.

FIG. 2 is a diagram of an example UI 200 generated by systems and/or methods described herein. For example, one or more elements of the example UI 200 depicted in FIG. 2 may be generated based on instructions from a remediation engine, as described above in connection with FIGS. 1A-1B. Accordingly, the example UI 200 may be shown by a user device. These devices are described in more detail in connection with FIGS. 3 and 4.

As shown in FIG. 2, the example UI 200 may include a visualization of a relational structure between cloud-based applications (shown as nodes labeled "ASVONE," "ASVTWO," "ASVTHREE," "ASVFOUR," and "ASVFIVE," among other examples) with corresponding connectors (e.g., based on an organization of the cloud-based applications). In FIG. 2, the cloud-based applications are grouped by host OSs (shown as nodes labeled "System Update 1.0," "System Update 1.1," and "System Update 1.2," among other examples). FIG. 2 further shows the host OSs grouped by host environments (shown as nodes labeled "ID 11111," "ID 22222," "ID 33333," and "ID 44444"). In FIG. 2, the host environments are grouped by enterprise (shown as a single node "Enterprise" in FIG. 2).

The example UI 200 may further be associated with a security vulnerability. Accordingly, as further shown in FIG. 2, the example UI 200 may include instance quantities affected by a security vulnerability. For example, in FIG. 2, three instances of "ASVONE" hosted by "System Update 1.0" are affected by the security vulnerability, and seven instances of "ASVTWO" hosted by "System Update 2.0" are affected by the security vulnerability. The quantities may also be shown for groups. For example, in FIG. 2, "System Update 1.0" hosts eight cloud-based application instances affected by the security vulnerability, and "System Update 3.0" hosts seven cloud-based application instances affected by the security vulnerability. Similarly, "ID 11111" supports thirty-seven cloud-based application instances affected by the security vulnerability, and "ID 44444" supports seventeen cloud-based application instances affected by the security vulnerability.

As further shown in FIG. 2, the example UI 200 may further indicate cloud-based applications associated with a false positive status. For example, as shown in FIG. 2, "ASVTHREE" and "ASVELEVEN" are shown with a dotted line that indicates that the cloud-based applications are associated with the false positive status (and thus not affected by the security vulnerability).

As indicated above, FIG. 2 is provided as an example. Other examples may differ from what is described with regard to FIG. 2. For example, the cloud-based applications may be grouped by fewer categories, more categories, or different categories than those shown in FIG. 2.

Figure 3:
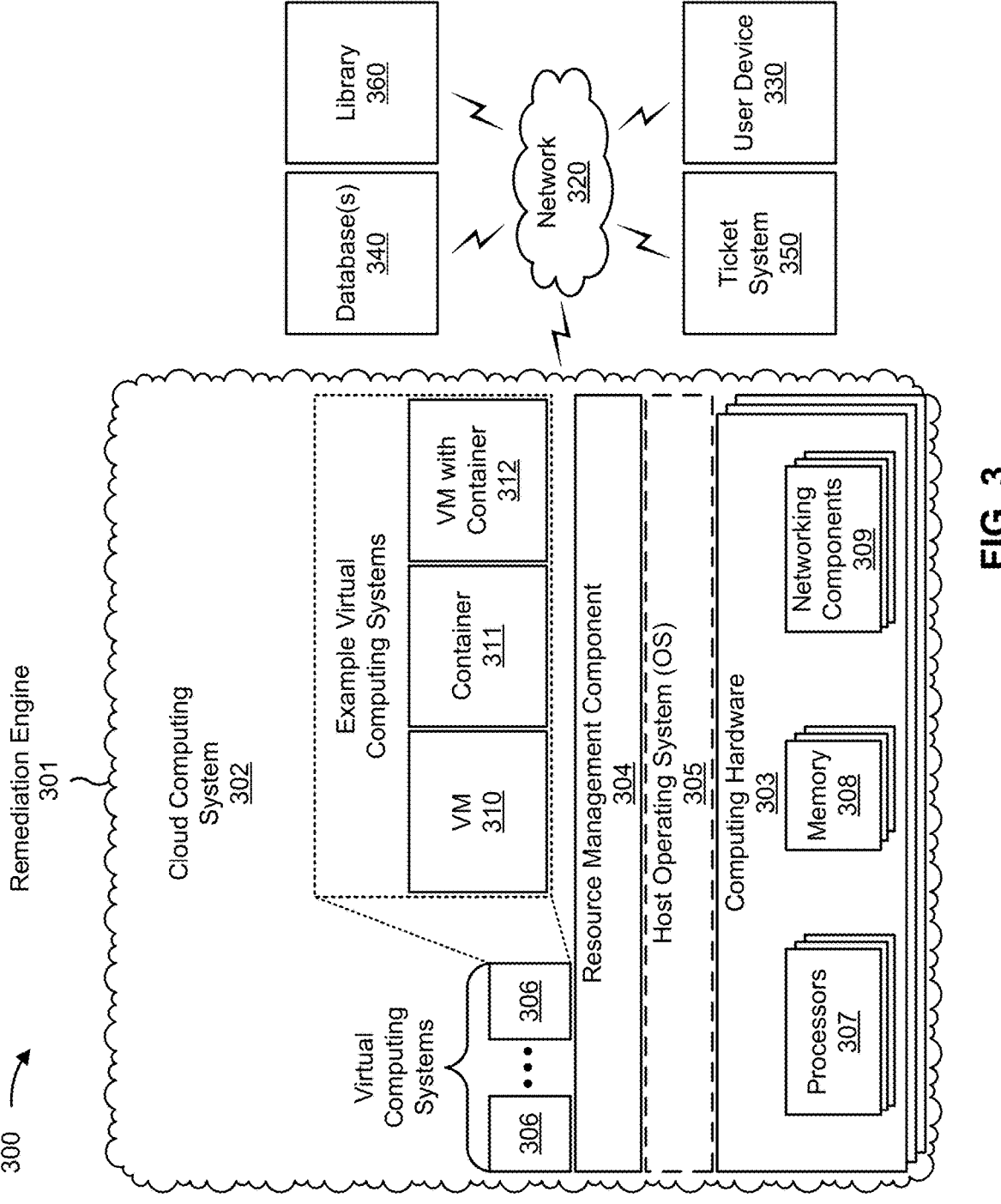
FIG. 3 is a diagram of an example environment in which systems and/or methods described herein may be implemented, in accordance with some embodiments of the present disclosure.

FIG. 3 is a diagram of an example environment 300 in which systems and/or methods described herein may be implemented. As shown in FIG. 3, environment 300 may include a remediation engine 301, which may include one or more elements of and/or may execute within a cloud computing system 302. The cloud computing system 302 may include one or more elements 303-312, as described in more detail below. As further shown in FIG. 3, environment 300 may include a network 320, a user device 330, one or more databases 340, a ticket system 350, and/or a library 360. Devices and/or elements of environment 300 may interconnect via wired connections and/or wireless connections.

The cloud computing system 302 may include computing hardware 303, a resource management component 304, a host OS 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

The computing hardware 303 may include hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, and/or one or more networking components 309. Examples of a processor, a memory, and a networking component (e.g., a communication component) are described elsewhere herein.

The resource management component 304 may include a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 310. Additionally, or alternatively, the resource management component 304 may include a container manager, such as when the virtual computing systems 306 are containers 311. In some implementations, the resource management component 304 executes within and/or in coordination with a host operating system 305.

A virtual computing system 306 may include a virtual environment that enables cloud-based execution of operations and/or processes described herein using computing hardware 303. As shown, a virtual computing system 306 may include a virtual machine 310, a container 311, or a hybrid environment 312 that includes a virtual machine and a container, among other examples. A virtual computing system 306 may execute one or more applications using a file system that includes binary files, software libraries, and/or other resources required to execute applications on a guest operating system (e.g., within the virtual computing system 306) or the host operating system 305.

Although the remediation engine 301 may include one or more elements 303-312 of the cloud computing system 302, may execute within the cloud computing system 302, and/or may be hosted within the cloud computing system 302, in some implementations, the remediation engine 301 may not be cloud-based (e.g., may be implemented outside of a cloud computing system) or may be partially cloud-based. For example, the remediation engine 301 may include one or more devices that are not part of the cloud computing system 302, such as device 400 of FIG. 4, which may include a standalone server or another type of computing device. The remediation engine 301 may perform one or more operations and/or processes described in more detail elsewhere herein.

The network 320 may include one or more wired and/or wireless networks. For example, the network 320 may include a cellular network, a public land mobile network (PLMN), a local area network (LAN), a wide area network (WAN), a private network, the Internet, and/or a combination of these or other types of networks. The network 320 enables communication among the devices of the environment 300.

The user device 330 may include one or more devices capable of receiving, generating, storing, processing, and/or providing information associated with security vulnerabilities, as described elsewhere herein. The user device 330 may include a communication device and/or a computing device. For example, the user device 330 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device. The user device 330 may communicate with one or more other devices of environment 300, as described elsewhere herein.

The database(s) 340 may be implemented on one or more devices capable of receiving, generating, storing, processing, and/or providing information associated with security vulnerabilities, as described elsewhere herein. The database(s) 340 may be implemented on a communication device and/or a computing device. For example, the database(s) 340 may be implemented on a server, a database server, an application server, a client server, a web server, a host server, a proxy server, a virtual server (e.g., executing on computing hardware), a server in a cloud computing system, a device that includes computing hardware used in a cloud computing environment, or a similar type of device. The database(s) 340 may communicate with one or more other devices of environment 300, as described elsewhere herein.

The ticket system 350 may include one or more devices capable of receiving, generating, storing, processing, and/or providing information associated with tickets, as described elsewhere herein. The ticket system 350 may include a communication device and/or a computing device. For example, the ticket system 350 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The ticket system 350 may include an issue tracking system, such as Jira® or Bugzilla®, among other examples. The ticket system 350 may communicate with one or more other devices of environment 300, as described elsewhere herein.

The library 360 may be implemented on one or more devices capable of receiving, generating, storing, processing, and/or providing information associated with remediation actions, as described elsewhere herein. The library 360 may be implemented on a communication device and/or a computing device. For example, the library 360 may be implemented on a server, a database server, an application server, a client server, a web server, a host server, a proxy server, a virtual server (e.g., executing on computing hardware), a server in a cloud computing system, a device that includes computing hardware used in a cloud computing environment, or a similar type of device. The library 360 may communicate with one or more other devices of environment 300, as described elsewhere herein.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
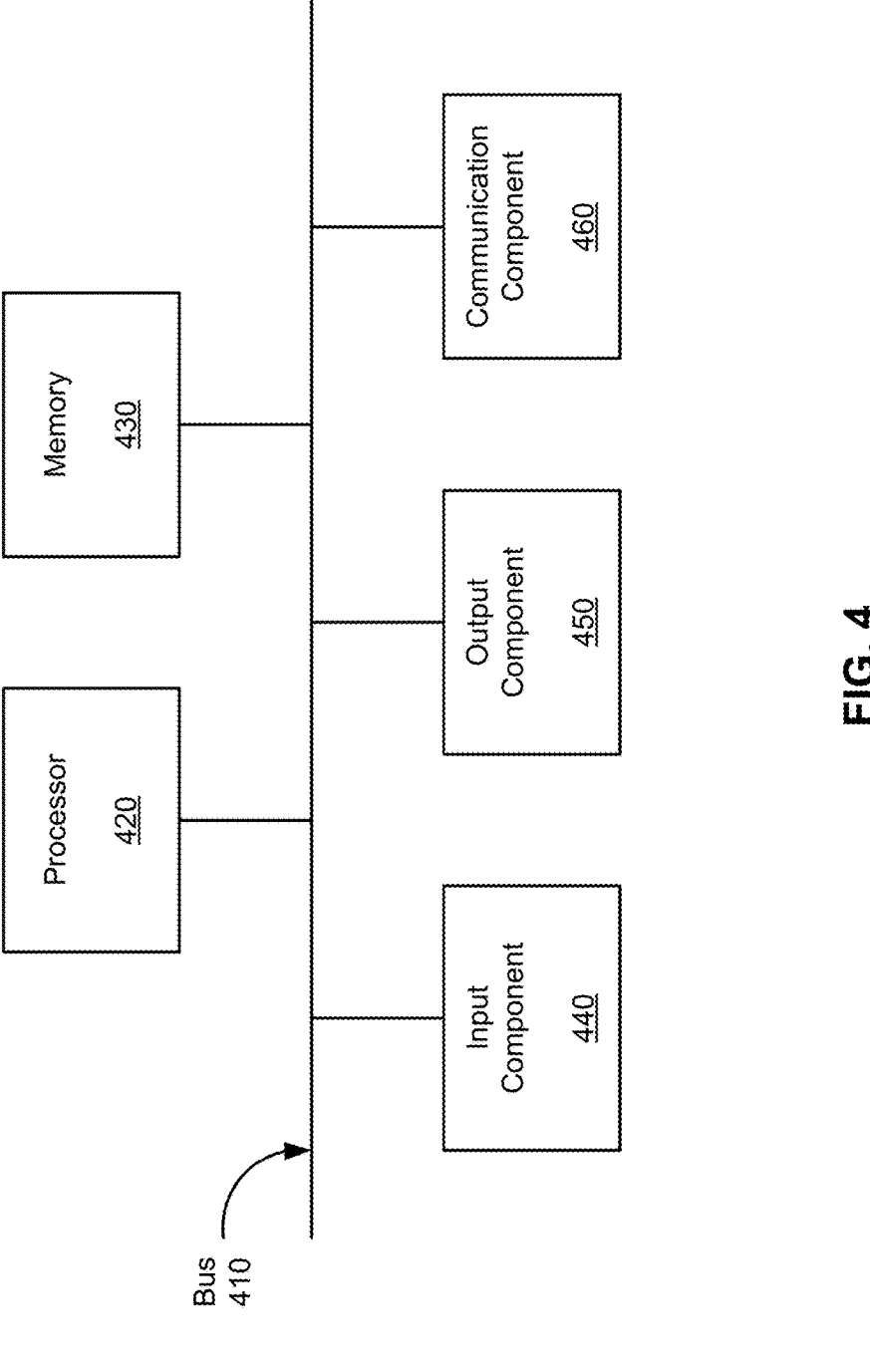
FIG. 4 is a diagram of example components of one or more devices of FIG. 3, in accordance with some embodiments of the present disclosure.

FIG. 4 is a diagram of example components of a device 400 associated with visualization of security vulnerabilities. The device 400 may correspond to a user device 330, a device implementing database(s) 340, a ticket system 350, and/or a device implementing library 360. In some implementations, the user device 330, the device implementing database(s) 340, the ticket system 350, and/or the device implementing library 360 may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

FIG. 5 is a flowchart of an example process 500 associated with visualization of security vulnerabilities. In some implementations, one or more process blocks of FIG. 5 may be performed by the remediation engine 301. In some implementations, one or more process blocks of FIG. 5 may be performed by another device or a group of devices separate from or including the remediation engine 301, such as a user device 330, a device implementing database(s) 340, a ticket system 350, and/or a device implementing library 360. Additionally, or alternatively, one or more process blocks of FIG. 5 may be performed by one or more components of the device 400, such as processor 420, memory 430, input component 440, output component 450, and/or communication component 460.

As shown in FIG. 5, process 500 may include receiving an indication of a security vulnerability (block 510). For example, the remediation engine 301 (e.g., using processor 420, memory 430, input component 440, and/or communication component 460) may receive an indication of a security vulnerability, as described above in connection with reference number 105 and/or reference number 110 of FIG. 1A. As an example, the remediation engine may receive the indication of the security vulnerability from a cloud environment, a cloud database, and/or a ticket system.

As further shown in FIG. 5, process 500 may include determining a plurality of cloud-based applications affected by the security vulnerability (block 520). For example, the remediation engine 301 (e.g., using processor 420 and/or memory 430) may determine a plurality of cloud-based applications affected by the security vulnerability, as described above in connection with FIG. 1A. As an example, the remediation engine may extract a plurality of indicators, corresponding to the cloud-based applications, from the indication of the security vulnerability. In another example, the remediation engine may receive, from a cloud environment, indications of the cloud-based applications, affected by the security vulnerability, based on dependencies between one cloud-based application associated with the security vulnerability and others of the cloud-based applications.

As further shown in FIG. 5, process 500 may include generating a relational structure that organizes the plurality of cloud-based applications (block 530). For example, the remediation engine 301 (e.g., using processor 420 and/or memory 430) may generate a relational structure that organizes the plurality of cloud-based applications, as described above in connection with reference number 115 of FIG. 1A. As an example, the remediation engine may receive information associated with the cloud-based applications and organize the cloud-based applications based on the information. For example, the information may include dependency indicators (e.g., references and/or other data structures) that indicate associations (e.g., data input and output, among other examples) between the cloud-based applications. Additionally, or alternatively, the information may include categories (optionally with sub-categories) associated with the cloud-based applications.

As further shown in FIG. 5, process 500 may include detecting that at least one cloud-based application is associated with a false positive status (block 540). For example, the remediation engine 301 (e.g., using processor 420 and/or memory 430) may detect that at least one cloud-based application is associated with a false positive status, as described above in connection with reference number 120 of FIG. 1B. As an example, the remediation engine may receive, from a data source, a bulletin or another type of information associated with the security vulnerability. Based on the bulletin, the remediation engine may determine that the at least one cloud-based application is unaffected by the security vulnerability. Additionally, or alternatively, the remediation engine may compare information from a cloud database with information from a cloud environment and/or a ticket system to determine that the at least one cloud-based application is unaffected by the security vulnerability. Additionally, or alternatively, the remediation engine may apply a machine learning model to determine that the at least one cloud-based application is unaffected by the security vulnerability.

As further shown in FIG. 5, process 500 may include transmitting, to a user device, instructions for a visual representation of the relational structure (block 550). For example, the remediation engine 301 (e.g., using processor 420, memory 430, and/or communication component 460) may transmit, to a user device, instructions for a visual representation of the relational structure, as described above in connection with reference number 125 of FIG. 1B. The visual representation may further indicate the at least one cloud-based application associated with the false positive status. As an example, the visual representation may be as described in connection with FIG. 2.

As further shown in FIG. 5, process 500 may include receiving, from the user device, an indication of an interaction with the visual representation (block 560). For example, the remediation engine 301 (e.g., using processor 420, memory 430, input component 440, and/or communication component 460) may receive, from the user device, an indication of an interaction with the visual representation, as described above in connection with reference number 155 of FIG. 1D. As an example, a user of the user device may interact with a UI including the visual representation (e.g., via a keyboard, a mouse, a touchscreen, or another type of input component) and trigger the user device to transmit the indication. The user may perform a left click, a tap, push an enter key, speak an audio command, or perform another type of action to interact with the UI.

As further shown in FIG. 5, process 500 may include triggering a remediation action in response to the indication of the interaction (block 570). For example, the remediation engine 301 (e.g., using processor 420 and/or memory 430) may trigger a remediation action in response to the indication of the interaction, as described above in connection with reference number 165 of FIG. 160. As an example, the remediation engine may execute an automated remediation script to trigger a patch and/or other software update to one of the cloud-based applications. In another example, the remediation engine may execute an automated remediation script to trigger a refresh (also referred to as a "reboot" or a "rehydration") of a cloud-based image supporting one of the cloud-based applications.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel. The process 500 is an example of one process that may be performed by one or more devices described herein. These one or more devices may perform one or more other processes based on operations described herein, such as the operations described in connection with FIGS. 1A-1E and/or 2. Moreover, while the process 500 has been described in relation to the devices and components of the preceding figures, the process 500 can be performed using alternative, additional, or fewer devices and/or components. Thus, the process 500 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for visualizing security vulnerabilities across cloud applications, the system comprising:
   one or more memories; and
   one or more processors, communicatively coupled to the one or more memories, configured to:
   receive an indication of a security vulnerability;
   determine a plurality of cloud-based applications affected by the security vulnerability;
   generate a relational structure that organizes the plurality of cloud-based applications, wherein the relational structure includes information associated with a priority level of the plurality of cloud-based applications, and wherein the priority level is determined based on mapping information from a database to information associated with the plurality of cloud-based applications;

detect that at least one cloud-based application, of the plurality of cloud-based applications, is associated with a false positive status;

determine for the plurality of cloud-based applications, corresponding quantities of instances of a cloud-based application, of the plurality of cloud-based application, affected by the security vulnerability;

transmit, to a user device, instructions for a visual representation of the relational structure and indicating the at least one cloud-based application associated with the false positive status, wherein the priority level of the plurality of cloud-based applications are represented in the visual representation, wherein the visual representation further indicates the corresponding quantities of instances, wherein the visual representation further includes a hierarchical structure wherein the cloud-based applications are grouped by host Operating Systems (OSS), and the host OSS grouped by host environments, and wherein each level of the hierarchical structure indicates a total corresponding quantities of the plurality of cloud-based applications affected by the security vulnerability for the level of the hierarchical structure;

receive, from the user device, an indication of an interaction with the visual representation;

and trigger a remediation action in response to the indication of the interaction.

2. The system of claim 1, wherein the one or more processors are further configured to:

transmit, to a ticket system, an indication of the remediation action.

3. The system of claim 2, wherein the one or more processors, to transmit the indication of the remediation action, are configured to:

identify at least one ticket associated with the security vulnerability; and transmit the indication, of the remediation action, including at least one identifier associated with the at least one ticket.

4. The system of claim 3, wherein the one or more processors, to identify the at least one ticket, are configured to:

transmit, to the ticket system, a request associated with the security vulnerability; and receive, from the ticket system, at least one data structure representing the at least one ticket.

5. The system of claim 1, wherein the one or more processors, to receive the indication of the security vulnerability, are configured to:

receive, from a database that stores information regarding security vulnerabilities, the indication of the security vulnerability.

6. The system of claim 1, wherein the one or more processors, to receive the indication of the security vulnerability, are configured to:

receive, from a cloud environment, the indication of the security vulnerability.

7. The system of claim 1, wherein the one or more processors, to detect that the at least one cloud-based application is associated with the false positive status, are configured to:

compare information from a database that stores information regarding security vulnerabilities with information from a cloud environment associated with the at least one cloud-based application.

8. The system of claim 1, wherein the visual representation includes a dotted line that indicates the at least one cloud-based application associated with the false positive status.

9. A method of visualizing security vulnerabilities across cloud applications, comprising:

receiving an indication of a security vulnerability;

determining a plurality of cloud-based applications affected by the security vulnerability;

generating a relational structure that organizes the plurality of cloud-based applications, wherein the relational structure includes information associated with a priority level of the plurality of cloud-based applications, and wherein the priority level is determined based on mapping information from a database to information associated with the plurality of cloud-based applications;

determining for the plurality of cloud-based applications, corresponding quantities of instances of a cloud-based application, of the plurality of cloud-based application, affected by the security vulnerability;

transmitting, to a user device, instructions for a visual representation of the relational structure and indicating the at least one cloud-based application associated with the false positive status, wherein the priority level of the plurality of cloud-based applications are represented in the visual representation, wherein the visual representation further indicates the corresponding quantities of instances, wherein the visual representation further includes a hierarchical structure wherein the cloud-based applications are grouped by host Operating Systems (OSS), and the host OSS grouped by host environments, and wherein each level of the hierarchical structure indicates a total corresponding quantities of the plurality of cloud-based applications affected by the security vulnerability for the level of the hierarchical structure;

receiving, from the user device, an indication of an interaction with the visual representation;

and triggering a remediation action in response to the indication of the interaction.

10. The method of claim 9, wherein triggering the remediation action comprises:

determining, for the security vulnerability, the remediation action based on output from a remediation engine; and wherein the remediation engine is a trained machine learning model.

11. The method of claim 9, wherein triggering the remediation action comprises:

receiving an indication of the remediation action from a remediation library.

12. The method of claim 9, wherein the visual representation includes a first color that indicates the plurality of cloud-based applications affected by the security vulnerability and a second color that indicates one or more additional cloud-based applications unaffected by the security vulnerability.

13. The method of claim 9,
wherein the relational structure comprises a tree structure.

14. A non-transitory computer-readable medium storing a set of instructions for visualizing security vulnerabilities across cloud applications, the set of instructions comprising:
one or more instructions that, when executed by one or more processors of a device, cause the device to:
receive an indication of a security vulnerability;
determine a plurality of cloud-based applications affected by the security vulnerability;
generate a relational structure that organizes the plurality of cloud-based applications,
wherein the relational structure includes information associated with a priority level of the plurality of cloud-based applications, and
wherein the priority level is determined based on mapping information from a database to information associated with the plurality of cloud-based applications;
determine for the plurality of cloud-based applications, corresponding quantities of instances of a cloud-based application, of the plurality of cloud-based application, affected by the security vulnerability;
transmit, to a user device, instructions for a visual representation of the relational structure and indicating the at least one cloud-based application associated with the false positive status,
wherein the priority level of the plurality of cloud-based applications are represented in the visual representation,
wherein the visual representation further indicates the corresponding quantities of instances,
wherein the visual representation further includes a hierarchical structure wherein the cloud-based applications are grouped by host Operating Systems (OSS), and the host OSS grouped by host environments, and
wherein each level of the hierarchical structure indicates a total corresponding quantities of the plurality of cloud-based applications affected by the security vulnerability for the level of the hierarchical structure;
receive, from the user device, an indication of an interaction with the visual representation;
and trigger a remediation action in response to the indication of the interaction.

15. The non-transitory computer-readable medium of claim 14,
wherein the one or more instructions, that cause the device to generate the relational structure, cause the device to:
receive, from a database, information associated with the plurality of cloud-based applications; and
organize the plurality of cloud-based applications based on the information.

16. The non-transitory computer-readable medium of claim 14,
wherein the one or more instructions, that cause the device to determine the plurality of cloud-based applications, cause the device to:
extract a plurality of indicators, corresponding to the plurality of cloud-based applications, from the indication of the security vulnerability.

17. The non-transitory computer-readable medium of claim 14,
wherein the one or more instructions, that cause the device to trigger the action, cause the device to:
determine at least one cloud-based application, of the plurality of cloud-based applications, associated with the interaction; and
generate a window, over the visual representation, that provides one or more details about the at least one cloud-based application.

18. The non-transitory computer-readable medium of claim 14,
wherein the one or more instructions, that cause the device to trigger the action, cause the device to:
receive at least one data structure representing at least one ticket associated with the security vulnerability; and
transmit an indication of the at least one ticket in response to the interaction.

19. The system of claim 1, wherein triggering the remediation action comprises: triggering an automated remediation script.

20. The method of claim 9, wherein triggering the remediation action comprises: triggering an automated remediation script.

* * * * *